(12) United States Patent
Kuninobu (10) Patent No.: US 9,129,232 B2
(45) Date of Patent: Sep. 8, 2015

(54) DETERMINATION TREE GENERATING APPARATUS

(75) Inventor: Shigeta Kuninobu, Yokohama (JP)

(73) Assignee: Kabushiki Kaisha Toshiba, Minato-ku, Tokyo (JP)

(*) Notice: Subject to any disclaimer, the term of this patent is extended or adjusted under 35 U.S.C. 154(b) by 697 days.

(21) Appl. No.: 13/421,691

(22) Filed: Mar. 15, 2012

(65) Prior Publication Data

US 2012/0173532 A1  Jul. 5, 2012

Related U.S. Application Data

(63) Continuation of application No. PCT/JP2009/066069, filed on Sep. 15, 2009.

(51) Int. Cl.
*G06F 19/00* (2011.01)
*G06Q 10/04* (2012.01)
*G06Q 10/00* (2012.01)
*G06Q 10/10* (2012.01)
*G06Q 99/00* (2006.01)

(52) U.S. Cl.
CPC .............. *G06Q 10/04* (2013.01); *G06Q 10/00* (2013.01); *G06Q 10/10* (2013.01); *G06Q 99/00* (2013.01)

(58) Field of Classification Search
None
See application file for complete search history.

(56) References Cited

FOREIGN PATENT DOCUMENTS

JP  2009-075734 A  4/2009
JP  2009-086137 A  4/2009

OTHER PUBLICATIONS

English Translation of IPRP dated Mar. 29, 2012 from corresponding PCT/JP2009/066069, 5 pages.
International Search Report dated Dec. 8, 2009 from PCT/JP2009/066069.
Quinlan, J.R.; "Induction of Decision Trees"; Machine Learning 1: 81-106, 1986.
Yoshiaki Kudo, et al.; "Ketteigi Seisei no Tameno Tekisetsu na Chushoka no Koyo"; Dai 49 Kai Special Internet Group on Knowledge-based Software Shiryo (SIG-KBS-A002), The Japanese Society for Artiical Intelligence, Sep. 28, 2000, pp. 13 to 19.

*Primary Examiner* — Sangwoo Ahn
(74) *Attorney, Agent, or Firm* — Ohlandt, Greeley, Ruggiero & Perle, L.L.P.

(57) ABSTRACT

According to one embodiment, a determination tree generating apparatus includes a determination unit, a condition generating unit, a determining unit, and a point branch generating unit. The determination unit provisionally and sequentially determines all component categories to be classification component categories for a first point of a determination tree. The point branch generating unit generates a first point assigned to a classification component category, and generates component names to be assigned to one or more branches leading from an assigned first point to one or more child points.

5 Claims, 6 Drawing Sheets

Determination tree (Left) Case where classification in order of component category X → component category Y is designated
(Right) Case where classification in order of component category Y → component category X is designated

FIG. 1

| Component combination | Product number |
|---|---|
| x1×y1×z1 | S001 |
| x1×y1×z2 | S001 |
| x1×y2×z1 | S001 |
| x1×y2×z2 | S001 |
| x2×y1×z1 | S003 |
| x2×y1×z2 | S003 |
| x2×y2×z1 | S002 |
| x2×y2×z2 | S002 |
| x3×y1×z1 | S001 |
| x3×y1×z2 | S001 |
| x3×y2×z1 | S001 |
| x3×y2×z2 | S001 |

| Component category X | Component category Y | Component category Z | Product number | Priority |
|---|---|---|---|---|
| x1 | y1 | z1 | S001 | 1 |
| x2 | y2 | ALL | S002 | 2 |
| x2 | ALL | ALL | S003 | 3 |
| ALL | ALL | ALL | S001 | 4 |

Determination tree (Left) Case where classification in order of component category X → component category Y is designated
(Right) Case where classification in order of component category Y → component category X is designated

DETERMINATION TREE GENERATING APPARATUS

CROSS-REFERENCE TO RELATED APPLICATIONS

This application is a Continuation Application of PCT Application No. PCT/JP2009/066069, filed Sep. 15, 2009, the entire contents of which are incorporated herein by reference.

FIELD

Embodiments described herein relate generally to a determination tree generating apparatus for generating a determination tree associated with a component combination table as a correspondence table of component combinations and product numbers.

BACKGROUND

Such a product as a PC is formed of a plurality of components (a CPU, a memory, an HDD, etc.). In general, each component is selected from a plurality of categories of components (in the case of, for example, a memory, it is selected from memories of 512 MB, 1024 MB, etc.). When designing such a product as the above, different product numbers are assigned to different combinations of components. However, a plurality of component combinations that have the same product number may exist. In general, the correspondence of the component combinations and the product numbers is shown in a table (hereinafter referred to as a component combination table). In this case, however, the larger the number of components categories and the number of components, the larger the number of combinations thereof and therefore the worse the readability of the table. To avoid this, there is a method of expressing the correspondence between the component combinations and the product numbers in the form of a determination tree in which labels at leaves correspond to product numbers, and labels at the other points (nodes) correspond to component categories, based on which classification of components is performed. In the case of expressing the correspondence using a determination tree, the size (i.e., the number of points (nodes)) of the tree varies depending upon the component category, based on which classification of components is made. As one method of generating a determination tree of a small size, there is a method of determining the categories of classified components utilizing ID3 algorithm (see, for example, J. R. Quinlan, Machine Learning 1 "Induction of Decision Trees," p 81-p 106 1986).

The larger the number of combinations of components, the larger the size of the component combination table, which makes it troublesome to search for the table to detect a product number corresponding to a particular component combination. If a determination tree is used, a target product number can be detected by tracing the tree from the root to the branch corresponding to a target product. However, even in the case of using the determination tree, if the number of nodes is increased, the depth of the tree is generally increased, which requires a lot of time and labor to detect the product number. Therefore, if a determination tree, which uses a smaller number of nodes to express the same content, is employed, the target product number can be more easily detected.

DETAILED DESCRIPTION

Referring to the accompanying drawings, a determination tree generating apparatus according to an embodiment will be described in detail.

In general, according to one embodiment, a determination tree generating apparatus includes an input unit, a correspondence information generating unit, a first condition generating unit, a provisional determination unit, an assignment/calculation unit, a second condition generating unit, an extracting unit, an element number calculating unit, a determining unit, and a point branch generating unit.

The input unit receives a correspondence table showing correspondence between product numbers and component combinations belonging to component categories. The correspondence information generating unit generates first correspondence information corresponding to the correspondence table and including an arrival condition list and the product numbers. The arrival condition list is a sum of sets of arrival conditions as elements each expressing one or more component combinations. The first condition generating unit generates a first arrival condition for a first point of a determination tree, based on one of the correspondence table and the first correspondence information. The provisional determination unit provisionally and sequentially determines all component categories to be classification component categories for the first point. Each of the all component categories is used for classification at none of second points that serve as ancestor points of the first point. The assignment/calculation unit assigns one of the classification component categories to the first point, and performs calculation for assigning component names to branches leading from the first point to one or more child points in accordance with the first arrival condition. The second condition generating unit generates a second arrival condition for each of the child points in accordance with the first arrival condition and the calculation. The extracting unit extracts, from the first correspondence information, second correspondence information associated with the second arrival condition. The element number calculating unit calculates, for each of the all component categories, number of elements included in an arrival condition list that is included in the second correspondence information. The determining unit determines that one of the all component categories, which corresponds to a minimal number of elements, is a classification component category for the first point. The classification component category is included in the classification component categories. The point branch generating unit generates a first point assigned to the classification component category, and generates component names to be assigned to one or more branches leading from the assigned first point to one or more child points, based on a calculation result of the assignment/calculation unit.

The determination tree generating apparatus of the embodiment can generate a determination tree that corresponds to a component combination table and has a smaller number of nodes.

An outline of the embodiment will firstly be described. The number of nodes of a determination tree varies depending upon the classification order of the categories of components. If the classification order is appropriately determined, a determination tree of a small size can be formed. As an existing method for the classification, ID3 algorithm is known. In the ID3 algorithm, an expected value for the average information amount associated with the component categories is calculated, and classification is performed based on the component category having the maximum expected value. In contrast, in the determination tree generating apparatus of the embodiment, no expected value for the average information amount is utilized, but the category of components to be classified is determined by paying attention to the number of elements in an arrival condition list that can express arbitrary component combinations.

Figure 1:
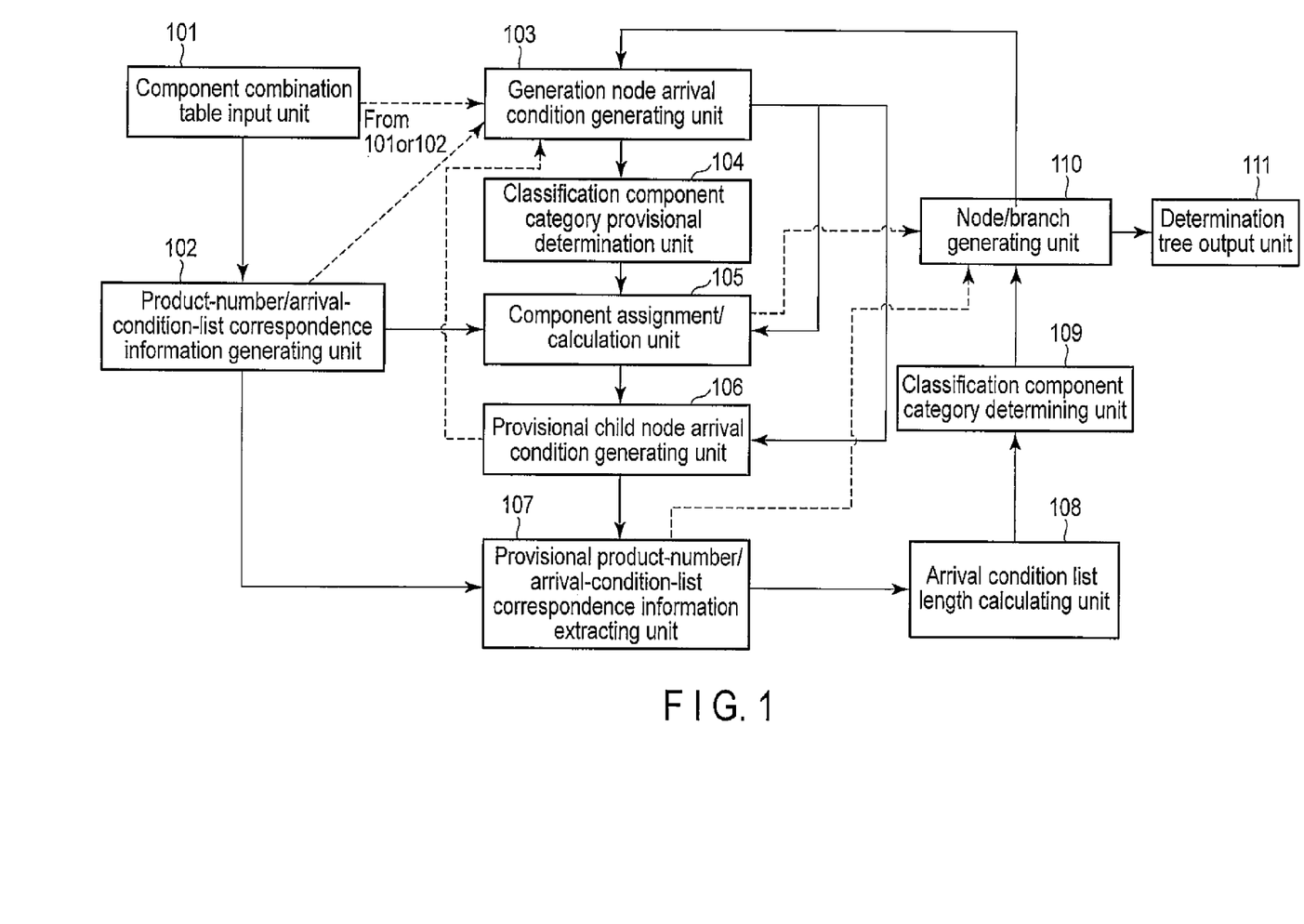
FIG. 1 is a block diagram illustrating a determination tree generating apparatus according to an embodiment.

Referring now to FIG. 1, the determination tree generating apparatus of the embodiment will be described.

The determination tree generating apparatus of the embodiment comprises a component combination table input unit 101, a product-number/arrival-condition-list correspondence information generating unit 102, a generation node arrival condition generating unit 103, a classification component category provisional determination unit 104, a component assignment/calculation unit 105, a provisional child node arrival condition generating unit 106, a provisional product-number/arrival-condition-list correspondence information extracting unit 107, an arrival condition list length calculating unit 108, a classification component category determining unit 109, node/branch generating unit 110 and a determination tree output unit 111.

Figure 2:
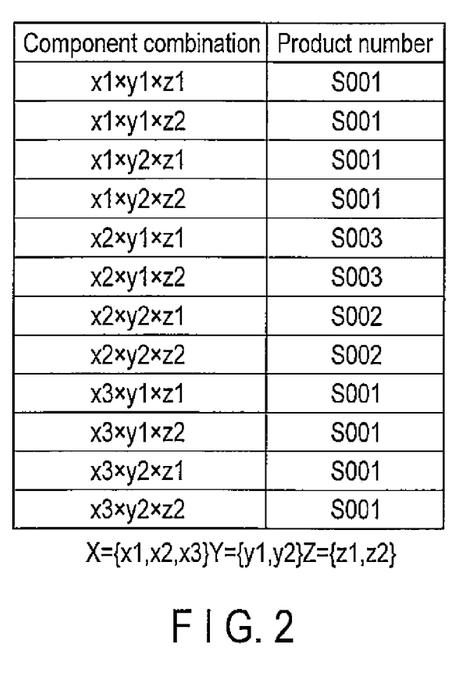
FIG. 2 is a view illustrating a component combination table example.
Figure 3:
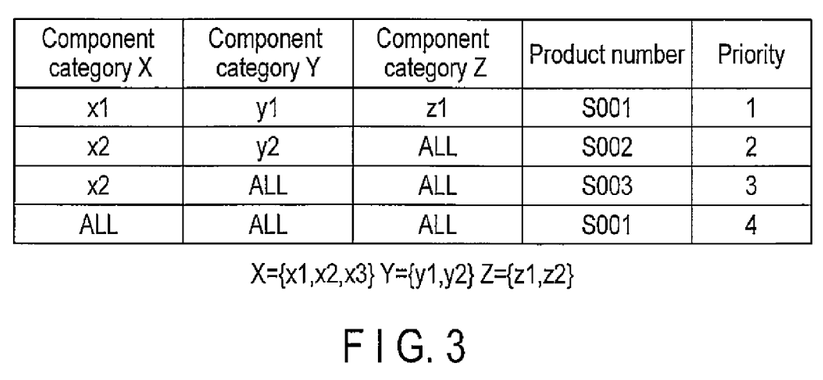
FIG. 3 is a view illustrating another component combination table example.

The input unit 101 is use to input a correspondence table (component combination table) of component combinations and product numbers. FIGS. 2 and 3 show examples of the component combination table.

In the component combination table example of FIG. 2, product numbers are assigned to all combinations of the components of a device. Namely, the device is formed of, for example, components belonging to component categories X, Y and Z. Components x1, x2 and x3 are classified into a component category X, components y1 and y2 are classified into a component category Y, and components z1 and z2 are classified into a component category Z. The component combination table of FIG. 3 is another type of table (if-then-else form) showing the same content as FIG. 2. In this table, row data items are read in the order of priority, i.e., 1→2→..., and the product number written in the row including a certain component combination corresponds to the combination. Compared to the FIG. 2 case where all combinations of components, the FIG. 3 case is advantageous in the point that the number of rows is reduced.

Figure 4:
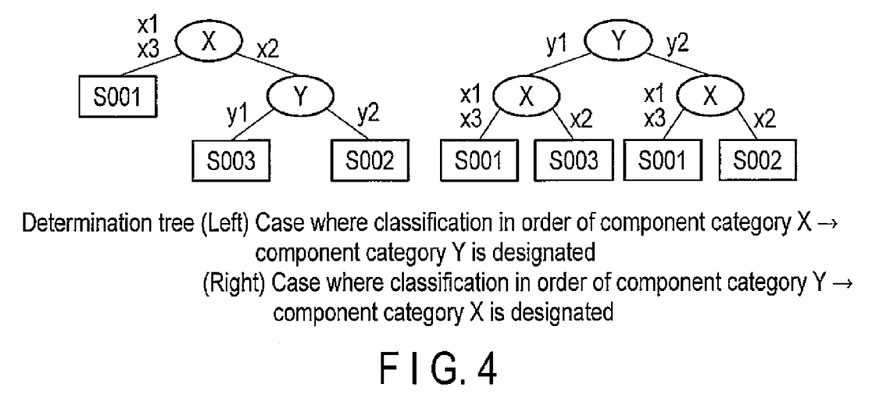
FIG. 4 is a view illustrating a determination tree indicating the component combination table shown in FIG. 2 or 3.

Referring then to FIG. 4, a description will be given of the determination tree. In the determination tree, each line connecting nodes is called a branch. Further, the point in the uppermost layer of the tree is called a root, and the points in the lowermost layer of the tree are called leaves. In the left portion of FIG. 4, X is the root, and S001, S003 and S002 are leaves. In the right portion of FIG. 4, Y is the root, and S001, S003 and S002 are leaves.

The determination tree shown in FIG. 4 expresses the same content as FIG. 2 or 3. If classification is performed in the order from the component category X to the component category Y, the determination tree shown in the left portion of FIG. 4 is generated. On the other hand, if classification is performed in the order from the component category Y to the component category X, the determination tree shown in the right portion of FIG. 4 is generated. The reason why there is no node for the component category Z is that there is no need of performing classification based on the component category Z. For instance, in the determination tree shown in the left portion of FIG. 4, the product number corresponding to a component combination of (x3, y2, z1) can be detected simply by tracing one branch. In contrast, in the determination tree shown in the right portion of FIG. 4, it is necessary to trace two branches to reach the same product number as the above. Namely, in the FIG. 4 case, the product number can be more quickly detected through the determination tree having a smaller number of nodes (i.e., the tree shown in the left portion of FIG. 4).

Returning to FIG. 1, the corresponding information generating unit 102 generates product-number/arrival-condition-list corresponding information (arrival condition list for each product number) corresponding to the input component combination table. The arrival condition list is the sum of sets of elements (each element expresses a component combination(s)), and will be described later in detail with reference to FIG. 5. Further, the product-number/arrival-condition-list corresponding information will be described later with reference to FIG. 6. Instead of the input unit 101 and the corresponding information generating unit 102, a corresponding information input unit (not shown) for directly inputting product-number/arrival-condition-list corresponding information may be incorporated.

The condition generating unit 103 generates an arrival condition for a node to be generated. If the node to be generated is the root of the determination tree, the condition generating unit 103 generates an arrival condition expressing an arbitrary combination of components, based on the component combination table input through the input unit 101, or based on the product-number/arrival-condition-list corresponding information corresponding to the component combination table and generated by the corresponding information generating unit 102. If the node to be generated is not the root of the determination tree, an arrival condition is calculated based on an arrival condition for an already generated parent node, and a component name attached to the branch (the result of the condition generating unit 106 can be used).

The provisional determination unit 104 provisionally determines concerning which component category classification is to be performed at each node to be generated. The provisional determination unit 104 provisionally and sequentially determines classification, at the nodes to be generated, concerning all component categories that are not yet used for classification at the nodes regarded as ancestors of the nodes to be generated.

The assignment/calculation unit 105 determines how each component name is assigned to each branch if the provisional determination unit 104 provisionally determines that classification is to be performed for the determined component category. The assignment/calculation unit 105 attempts to assign a plurality of component names to one branch as far as possible in order to minimize the number of branches, on condition that the lastly produced leaves necessarily indicate respective product numbers. The component assignment method employed by the assignment/calculation unit 105 will be described later with reference to FIG. 7.

The condition generating unit 106 calculates and generates child node arrival conditions if classification is to be made for the classification component category provisionally determined by the provisional determination unit 104.

The correspondence information extracting unit 107 extracts product-number/arrival-condition-list correspondence information, associated with the child node arrival condition generated by the condition generating unit 106, from the product-number/arrival-condition-list correspondence information generated by the correspondence information generating unit 102.

The list length calculating unit 108 sums up the elements of the arrival condition lists corresponding to all child nodes and included in the product-number/arrival-condition-list correspondence information extracted by the correspondence information extracting unit 107 and associated with the child node arrival conditions.

The determining unit 109 determines, as a component category to be used for classification at the node to be generated, one of the component categories provisionally determined by the provisional determination unit 104, the sum of the elements of the one component category calculated by the list length calculating unit 108 being minimum.

The generating unit 110 generates the node for the component category determined by the determining unit 109, and also generates a branch connecting the generated node to a child node. The component name(s) attached to the branch may be set by again performing the calculation once performed by the assignment/calculation unit 105, or by using the calculation result of the assignment/calculation unit 105. If the child node corresponds to a single product number, a child point (serving as a leaf) connected to the product number is also generated. If a branch with no leaf remains, the node or leaf to be generated for the branch is set as the node or leaf to be subsequently generated, and is informed of to the condition generating unit 103.

The output unit 111 outputs (displays) a completed determination tree. The output unit 111 may acquire data on a node or a branch whenever the generating unit 110 generates the same, and display a progression of generation. The output unit 111 outputs a determination tree when leaves are generated at all branches.

Figure 5:
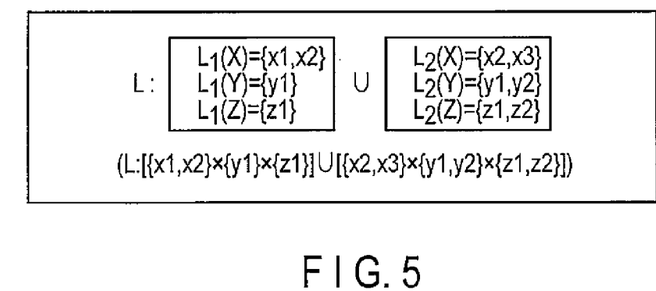
FIG. 5 is a view illustrating an arrival condition list example utilized by the product-number/arrival-condition-list correspondence information generating unit shown in FIG. 1.

Referring then to FIG. 5, a description will be given of an arrival condition list used by the correspondence information generating unit 102.

The arrival condition list has a data structure in which an arbitrary component combination can be expressed. The arrival condition list L shown in FIG. 5 includes two elements, one element indicating the component combinations expressed by $L_1(X) \times L_1(Y) \times L_1(Z)$, and the other element indicating the component combinations expressed by $L_2(X) \times L_2(Y) \times L_2(Z)$. The entire arrival condition list L expresses the component combinations defined by the sum of the component combinations expressed by $L_1(X) \times L_1(Y) \times L_1(Z)$, and the component combinations expressed by $L_2(X) \times L_2(Y) \times L_2(Z)$. More specifically, the list expresses nine component combinations of (x1, y1, z1), (x2, y1, z1), (x2, y1, z2), (x2, y2, z1), (x2, y2, z2), (x3, y1, z1), (x3, y1, z2), (x3, y2, z1), and (x3, y2, z2). Although (x2, y1, z1) is defined in both elements, there is no problem (it is regarded as a single component combination).

Further, the arrival condition list with one element is especially called an arrival condition. The arrival condition can also be set at each node of the determination tree, and corresponds to a component combination to reach each node. In the arrival condition list L shown in FIG. 5, the arrival condition as the first element is expressed as $[\{x1, x2\} \times \{y1\} \times \{z1\}]$, the arrival condition as the second element is expressed as $[\{x2, x3\} \times \{y1, y2\} \times \{z1, z2\}]$, and the arrival condition list L is expressed as $[\{x1, x2\} \times \{y1\} \times \{z1\}] \cup [\{x2, x3\} \times \{y1, y2\} \times \{z1, z2\}]$.

Figure 6:
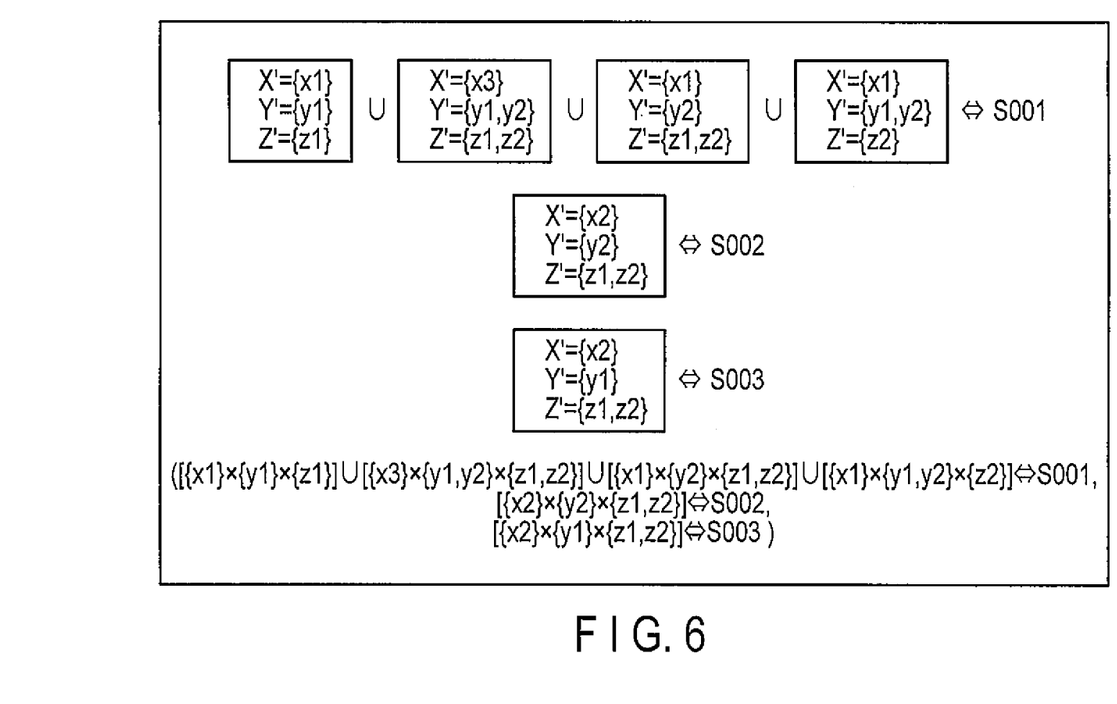
FIG. 6 is a view illustrating an example of product-number/arrival-condition-list correspondence information generated by the product-number/arrival-condition-list correspondence information generating unit shown in FIG. 1.

Referring now to FIG. 6, a description will be given of the product-number/arrival-condition-list correspondence information generated by the correspondence information generating unit 102.

The product-number/arrival-condition-list correspondence information is information (an arrival condition list corresponding to each product number) obtained by expressing a combination(s) of components corresponding to each product number in the form of an arrival condition list. In the example of FIG. 6, the product-number/arrival-condition-list correspondence information represents the same content as that of FIG. 2 or 3. The product-number/arrival-condition-list correspondence information of FIG. 6 is expressed as $[\{x1\} \times \{y1\} \times \{z1\}] \cup [\{x3\} \times \{y1, y2\} \times \{z1, z2\}] \cup [\{x1\} \times \{y2\} \times \{z1, z2\}] \cup [\{x1\} \times \{y1, y2\} \times \{z2\}] \Leftrightarrow S001$, $[\{x2\} \times \{y2\} \times \{z1, z2\}] \Leftrightarrow S002$, $[\{x2\} \times \{y1\} \times \{z1, z2\}] \Leftrightarrow S003$.

Figure 7:
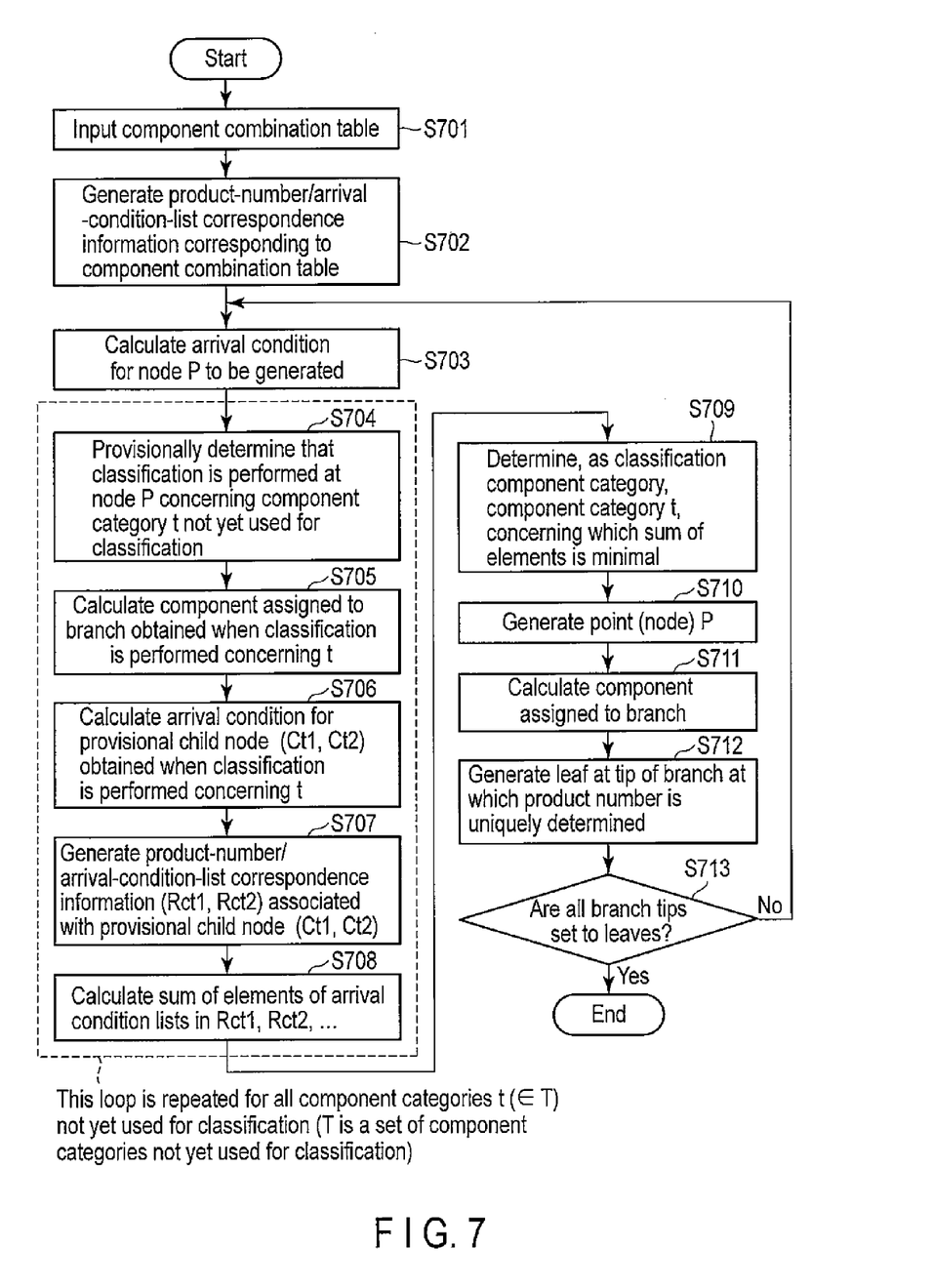
FIG. 7 is a flowchart useful in explaining an operation of generating a determination tree by the determination tree generating apparatus of FIG. 1.

Referring then to FIG. 7, a description will be given of a method of generating a determination tree from the component combination table shown in FIG. 3.

(Step S701) A component combination table is input through the input unit 101. For instance, a component combination table prepared by a user is input through the input unit 101. The input unit 101 acquires information indicating that there are three component categories X, Y and Z, the component category X includes components x1, x2 and x3, the component category Y includes components y1 and y2, and the component category Z includes components z1 and z2.

(Step S702) The product-number/arrival-condition-list correspondence information generating unit 102 generates product-number/arrival-condition-list correspondence information (an arrival condition list per each product number) corresponding to the input component combination table. In FIG. 3, it can be understood from the row of priority 1 that the component combination expressed by arrival condition L1=$[\{x1\} \times \{y1\} \times \{z1\}]$ corresponds to product number S001. Similarly, it can be understood from the row of priority 2 that the component combinations expressed by arrival condition L2=$[\{x2\} \times \{y2\} \times \{z1, z2\}]$ corresponds to product number S002. Regarding the row of priority 3 in FIG. 3, arrival condition L3'=$[\{x2\} \times \{y1, y2\} \times \{z1, z2\}]$ corresponds to product number S003. However, the arrival condition L3' includes the component combinations already defined by the arrival condition L2. Namely, it is necessary to set arrival condition list L3 corresponding to the row of priority 3 to the component combinations obtained by subtracting the component combinations expressed by L2 from the component combinations expressed by L3', i.e., to L3=L3'−L2=$[\{x2\} \times \{y1\} \times \{z1, z2\}]$. Similarly, regarding the row of priority 4 in FIG. 3, arrival condition list L4=L4'−L3−L2−L1 (L4'=$[\{x1, x2, x3\} \times \{y1, y2\} \times \{z1, z2\}]$). As a result, L4=$[\{x3\} \times \{y1, y2\} \times \{z1, z2\}] \cup [\{x1\} \times \{y2\} \times \{z1, z2\}] \cup [\{x1\} \times \{y1, y2\} \times \{z2\}]$. A subtraction operation for the arrival condition lists will be described later.

Lastly, the arrival condition lists of the rows with the same product number are connected, thereby obtaining the arrival condition lists corresponding to the respective product numbers (product-number/arrival-condition-list correspondence information). In the case of generating product-number/arrival-condition-list correspondence information from the component combination table of FIG. 3, an arrival condition list L1∪ L4 corresponds to product number S001, L2 corresponds to S002, and L3 corresponds to S003 (i.e., the product-number/arrival-condition-list correspondence information shown in FIG. 6).

(Step S703) The condition generating unit 103 calculates an arrival condition for point P to be generated. The determination tree is generated from the root to the leaf (leaves). The point P to be generated first is the root. The arrival condition that expresses an arbitrary component combination(s) serving as the arrival condition for the root is generated from the component combination table input at step S701 or the product-number/arrival-condition-list correspondence information generated at step S702. Since the point P is the root, the arrival condition [{x1, x2, x3}×{y1, y2}×{z1, z2}], at which all component combinations arrive, is generated. This arrival condition can be generated since it is detected at step S701 what component category (categories) and what components exist.

(Step S704) The provisional determination unit 104 sequentially selects a component category t (∈ T) at the point P from all component categories T (={$t_a, t_b, \ldots$}) not yet used for classification at a node as an ancestor of the point P. Since the point P is the root at present, there is no already classified component category. Namely, t ∈ {X, Y, Z}. The point as an ancestor of the point P is a node closer to the root than the point P.

(Step S705) If the component assignment/calculation unit 105 performs classification associated with the component category t selected at step S704, it determines components to be assigned to the branch that connects the point P to a child node. In other words, the component assignment/calculation unit 105 determines what component names should be assigned to the branch. If it is determined that no component assignment is necessary, this means that it is not necessary to divide a branch in association with the currently checking component category t. In this case, the process is returned to step S704, where a subsequent component category is selected.

When t=X, the component assignment/calculation unit 105 determines that two branches, to one of which x1 and x3 are assigned, and to the other of which x2 is assigned, should be divided from the point (i.e., root) P, as is shown in the left portion of FIG. 4. The reason why x2 is assigned to the other branch is that the resultant leaves are made to correspond to respective product numbers. Further, the reason why x1 and x3 are assigned to a single branch is to minimize the number of branches (even if x1 and x3 are assigned to different branches, the resultant leaves are made to correspond to the respective product numbers). When t=Y, the component assignment/calculation unit 105 determines that two branches, to which y1 and y2 are assigned, should be divided from the point (i.e., root) P, as is shown in the right portion of FIG. 4. Further, when t=Z, the component assignment/calculation unit 105 determines that a single branch with z1 and z2 attached should be generated. This is because it is not necessary to divide branches in association with Z. At this time, it is detected that there is no need of classification associated with the component category Z, and therefore it is not necessary to consider the case of t=Z in subsequent process steps. The component assignment/calculation unit 105 attempts to assign as many component names as possible to one branch so as to minimize the number of branches, and to make all leaves have respective product numbers. A method of assigning component names to branches will be described later.

(Step S706) The condition generating unit 106 generates an arrival condition ($R_{Ct1}, R_{Ct2}, \ldots$) for a child node ($C_{t1}, C_{t2}, \ldots$) assumed when the point P is subjected to classification regarding the component category t. If there exist a plurality of product numbers that correspond to component combinations, a plurality of child nodes are generated. At this time, the child nodes are not actually generated ones, and are therefore called provisional child nodes. In this process, it is not necessary to actually generate child nodes, but it is sufficient if an arrival condition for each provisional child node (this is not actually generated) of the point (node) P is calculated, assuming that the point P is divided in association with the component category t. If t=X, from the result of step S705, provisional child node $C_{x1}$ connected to the point P via a branch with x1 and x3 attached, and provisional child node $C_{x2}$ connected to the point P via a branch with x2 attached, are generated. In this case, the point P is the root, and the arrival condition is [{x1, x2, x3}×{y1, y2}×{z1, z2}] from the result of step S703. Since component combinations limited to x1 and x3 arrive at the provisional child node $C_{x1}$, the arrival condition is [{x1, x3}×{y1, y2}×{z1, z2}]. Similarly, the arrival condition for $C_{x2}$ is [{x2}×{y1, y2}×{z1, z2}]. If t=Y, from the result of step S705, provisional child node $C_{y1}$ connected to the point P via a branch with y1 attached, and provisional child node $C_{y2}$ connected to the point P via a branch with y2 attached, are generated. In this case, the respective arrival conditions are [{x1, x2, x3}×{y1}×{z1, z2}], and [{x1, x2, x3}×{y2}×{z1, z2}].

(Step S707) The correspondence information extracting unit 107 extracts, from the product-number/arrival-condition-list generated at step S702, product-number/arrival-condition-list correspondence information ($R_{Ct1}, R_{Ct2}, \ldots$) associated with the arrival condition for the provisional child node generated at step S706. Specifically, if t=X, the arrival condition for $C_{x1}$ [{x1, x3}×{y1, y2}×{z1, z2}] is obtained by excluding component combinations associated with x2 from the root having arrival conditions for all component combinations. Therefore, the associated product-number/arrival-condition-list correspondence information is obtained by deleting information associated with component x2 from the product-number/arrival-condition-list calculated at step S702 (in other words, the correspondence information is the information associated with x1 and x3). Namely, product-number/arrival-condition-list correspondence information $R_{Cx1}$: [{x1}×{y1}×{z1}] ∪ [{x3}×{y1, y2}×{z1, z2}] ∪ [{x1}×{y2}×{z1, z2}] ∪ [{x1}×{y1, y2}×{z2}] ⇔ S001, ∅ ⇔ S002, ∅ ⇔ S003 is obtained. ∅ represents an arrival condition list for an element number of 0. Similarly, for the arrival condition set for the provisional child node $C_{x2}$, product-number/arrival-condition-list correspondence information $R_{Cx2}$: ∅ ⇔ S001, [{x2}×{y2}×{z1, z2}] ⇔ S002, [{x2}×{y1}×{z1, z2}] ⇔ S003 is obtained. Also similarly, if t=Y, $R_{Cy1}$: [{x1}×{y1}×{z1}] ∪ [{x3}×{y1}×{z1, z2}] ∪ [{x1}×{y1}×{z2}] ⇔ S001, ∅ ⇔ S002, [{x2}×{y1}×{z1, z2}], and $R_{Cy2}$: [{x3}×{y2}×{z1, z2}] ∪ [{x1}×{y2}×{z1, z2}] ∪ [{x1}×{y2}×{z2}] ⇔ S001, [{x2}×{y2}×{z1, z2}] ⇔ S002, ∅ ⇔ S003, are obtained.

(Step S708) The list length calculating unit 108 adds up, for each component category t, arrival condition list elements ($|R_t|$) included in the product-number/arrival-condition-list correspondence information obtained at step S707. If t=X, the list length calculating unit 108 adds up arrival condition list elements ($|R_{cx1}|$) included in $R_{cx1}$, and adds up arrival condition list elements ($|R_{cx2}|$) included in $R_{cx2}$. As a result, $|R_x|=|R_{cx1}|+|R_{cx2}|=6$. Similarly, if t=Y, arrival condition list elements ($|R_{cy1}|$) included in $R_{cy1}$ are added up, and arrival condition list elements ($|R_{cy2}|$) included in $R_{cx2}$ are added up. As a result, $|R_y|=|R_{cy1}|+|R_{cy2}|=8$.

(Step S709) The determining unit 109 determines that the one of component categories t ($\in$ T), in which the number ($|R_t|$) of the arrival condition list elements obtained at step S708 is smallest, is determined as the component category to be used for classification at the point P. In this example, since $|R_X|<|R_Y|$, it is determined that classification is performed regarding component category X at the point P.

(Step S710) The generating unit 110 generates a point P at which classification is performed regarding component category X determined at step S709.

(Step S711) The generating unit 110 generates a branch leading from the point P to a child node. The result of step S705 is reused as the component name(s) attached (classified) to the branch leading to the child node.

Figure 8:
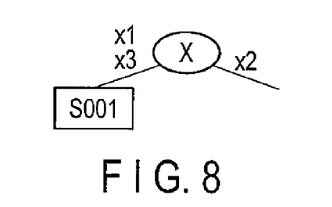
FIG. 8 is a view illustrating a determination tree example generated at step S712 (first time) of FIG. 7.

(Step S712) The generating unit 110 generates leaves corresponding to respective product numbers. Specifically, it generates a leaf with product number S001 as child node $C_{X1}$, since it can be understood from the product-number/arrival-condition-list correspondence information $R_{Cx1}$ (this is reused information obtained at step S707) that the child node $C_{X1}$ corresponds to the product number S001 (because the number of arrival condition list elements corresponding to each of product numbers S002 and S003 is 0, the child node $C_{X1}$ has to correspond to the product number S001). Regarding child node $C_{X2}$ connected to the point P via a branch with the component name x2, any leaf is not yet generated since it can be understood from $R_{Cx2}$ that classification to a single product number cannot be performed at the child node. FIG. 8 shows a determination tree generated by the process steps so far. If the progress of generation of the determination tree is also displayed, the determination tree of FIG. 8 is transferred to the output unit 111 for the display.

(Step S713) The generating unit 110 checks whether all branches lead to leaves (points that express product numbers). If leaves are generated at the tips of all branches, the generated determination tree is transferred to the output unit 111, where it is displayed. In contrast, if a branch tip with no leaf remains (in this example, the tip is the point corresponding to $C_{X2}$ at step S712), this tip is determined to be the point P to be subsequently generated, and the program returns to step S703.

(Step S703: Second time) The condition generating unit 103 calculates an arrival condition for the point P to be generated. At present, since the point P is the child node connected via a branch with component name x2 to the parent point having an arrival condition [{x1, x2, x3}×{y1, y2}×{z1, z2}], the arrival condition for the point P is [{x2}×{y1, y2}×{z1, z2}] (this value is once calculated at step S706 and is therefore reused at this step).

(Step S704: Second time) Since at the point P, the component categories Y and Z are not classified, the provisional determination unit 104 selects Y and Z as classification component categories t.

(Step S705 (second time) to step S709 (second time)) The component assignment/calculation unit 105 determines assignment of components to a branch (branches) obtained when classification is performed in associated with the component category t. In this case, it is determined that if t=Y, it is sufficient if a branch with y1 and a branch with y2 are generated, and that if t=Z, it is determined that only a single branch with z1 and z2 is generated (because no classification is required for the component category Z). At this point of time, the component category to be used for classification at the point P is determined to be Y. Simply to determine the component category used for classification at the point P, the steps S706 to S709 are unnecessary. However, to check whether each child node of the point P corresponds to a single product number, the arrival condition for each child node, and product-number/arrival-condition-list correspondence information associated with each child node, are beforehand calculated (steps S706 and S707).

(Step S710: Second time) The generating unit 110 generates a point P subjected to classification associated with the component category Y, as the child node of the branch with the component name x2 led from the root (the parent node of the point P).

(Step S711: Second time) The generating unit 110 generates a branch led from the point P to the child node. The result of step S705 (second time) is reused as the component name assigned to the branch.

(Step S712: Second time) The generating unit 110 generates leaves corresponding to respective product numbers. In the present case, all child nodes correspond to respective product numbers, with the result that the determination tree as shown in the left portion of FIG. 4 is generated. So far, leaves have been generated at the tips of all branches.

(Step S713: Second time) The generating unit 110 confirms whether leaves have been generated at the tips of all branches, i.e., whether the determination tree has been completed. The generating unit 110 transfers the determination tree to the output unit 111, where it is displayed.

Assignment of component names to branches performed at step S705 by the assignment/calculation unit 105 will be described. In this method, as many component names as possible are assigned to each branch so that the number of required branches is minimized and all leaves necessarily have their respective product numbers. A description will now be given of a procedure performed until a result that it is sufficient if a branch with x1 and x3 and a branch with x2 are generated from the root P when the component category used for classification is determined X at step S705 (first time) of FIG. 7 is output. The arrival condition for the root P is already calculated at [{x1, x2, x3}×{y1, y2}×{z1, z2}]. Firstly, when one component x $\in$ {x1, x2, x3} is assigned to a branch, product-number/arrival-condition-list correspondence information Rx associated with the arrival condition for a child node of the branch is calculated (it can be calculated by the same method as that employed at step S707 of FIG. 7). Specifically, the following product-number/arrival-condition-list correspondence information items are obtained:

$R_{x1}$: [{x1}×{y1}×{z1}] ∪ [{x1}×{y2}×{z1, z2}] ∪ [{x1}×{y1, y2}×{z2}] ⇔ S001, Ø ⇔ S002, Ø ⇔ S003;

$R_{x2}$: Ø ⇔ S001, [{x2}×{y2}×{z1, z2}] ⇔ S002, [{x2}×{y1}×{z2}] ⇔ S003; and $R_{x3}$: [{x3}×{y1, y2}×{z1, z2}] ⇔ S001, Ø ⇔ S002, Ø ⇔ S003

For the explanation below, assume here that L (x, s) represents an arrival condition list corresponding to the product number s in $R_x$. For instance, L (x2, S002) represents [{x2}×{y2}×{z1, z2}].

The assignment/calculation unit 105 determines whether two component names c1 and c2 must be assigned to different branches, using the following determination method:

(Determination Method)

Assuming that c1=c2, it is determined whether two product numbers s1 and s2 (s1≠s2) can exist which make the following discriminant true:

(L (c1, s1) ∪ L (c2, s1)) ∩ (L (c1, s2) ∪ L (c2, s2))≠Ø

The fact that s1 and s2, which makes the above discriminant true, exist means that if c1 and c2 are assigned to the same branch, the product numbers s1 and s2 cannot be separated at a leaf. When branches generated when the root is subjected to classification in association with the component category X are calculated, it is sufficient if the above-mentioned determination method is applied to combinations (x1, x2), (x1, x3) and (x2, x3) of arbitrary two of components {x1, x2, x3}. In this example, a result that it is necessary to assign x1 and x2, and x2 and x3, to different branches, and it is not necessary to assign x1 and x3 to different branches, is obtained. Namely, when the root is subjected to classification in association with the component category X, it is necessary to generate two branches, i.e., the branch with x1 and x3 assigned thereto, and the branch with x2 assigned thereto.

Figure 9:
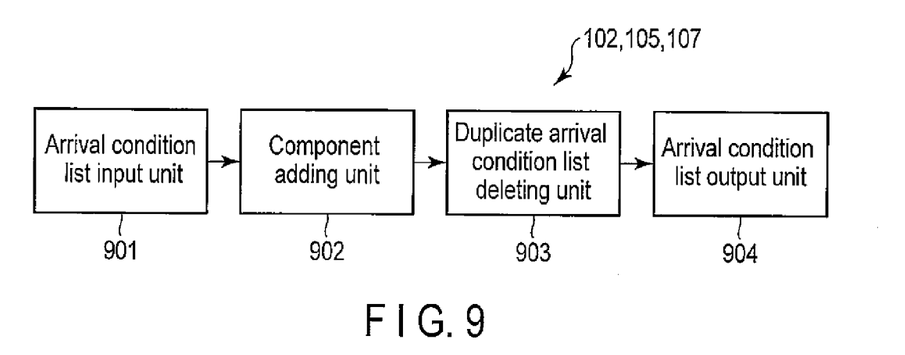
FIG. 9 is a block diagram illustrating an abbreviation processing unit that may be incorporated in the product-number/arrival-condition-list correspondence information generating unit, the component division calculating unit, and the provisional child node associated product-number/arrival-condition-list correspondence information extracting unit, which are shown in FIG. 1.

Referring then to FIG. 9, a description will be given of desirable contraction processing performed by the correspondence information generating unit 102, the assignment/calculation unit 105 and the correspondence information extracting unit 107.

The arrival condition lists have a data structure for expressing arbitrary combinations of components. However, the arrival condition lists and arbitrary component combinations do not have one-to-one correspondence (i.e., a plurality of arrival condition lists can exist for expressing the same component combination). In the embodiment, if arrival condition lists contain the same content, the less the number of elements (arrival conditions), the easier construction of a determination tree with a small number of points or nodes, and the more advantageous in calculation time and the memory area necessary for the calculation. Accordingly, it is desirable that the correspondence information generating unit 102, the assignment/calculation unit 105 and the correspondence information extracting unit 107 perform processing (contraction processing) for minimizing the number of elements of each arrival condition list, or shortening the length of each arrival condition list as much as possible.

FIG. 9 is a block diagram illustrating a device for performing contraction processing. This device comprises an arrival condition list input unit 901, a component adding unit 902, a duplicate arrival condition list deleting unit 903, and an arrival condition list output unit 904. A description will now be given of a method for contracting arrival condition list L=[{x1}×{y1}×{z1}] ∪ [{x3}×{y1, y2}×{z1, z2}] ∪ [{x1}×{y2}×{z1, z2}] ∪ [{x1}×{y1, y2}×{z2}] (this is identical to the arrival condition list corresponding to S001 in FIG. 6). For facilitating the description, the four elements of the arrival condition list L will be expressed as $L^1$, $L^2$, $L^3$ and $L^4$ ($L^1$=[{x1}×{y1}×{z1}], $L^2$=[{x3}×{y1, y2}×{z1, z2}], $L^3$ [{x1}×{y2}×{z1, z2}], and $L^4$=[{x1}×{y1, y2}×{z2}], L=$L^1$ ∪ $L^2$ ∪ $L^3$ ∪ $L^4$).

Firstly, the arrival condition list input unit 901 accepts an arrival condition list L to be contracted. Subsequently, regarding each component category (X, Y, Z) defined in the arrival condition list L, the component adding unit 902 checks components included in the list L. In the above-mentioned example, regarding the component category X, {x1, x3} (this combination is set to X') is included in the L list. Similarly, regarding the component category Y, {y1, y2} (this combination is set to Y') is included in the L list. Further, regarding the component category Z, {z1, z2} (this combination is set to Z') is included in the L list. After that, to each element ($L^1$, $L^2$, $L^3$ and $L^4$) of the list L, components included in X', Y' and Z' are added so as not to change the total component combinations in the list L. For instance, if z2 is added to $L^1$, $L^{1'}$=[{x1}×{y1}×{z1, z2}]. In this case, a new component combination of {x1}×{y1}×{z2} is additionally included. However, the combination of {x1}×{y1}×{z2} is initially included in the combinations expressed by $L^4$, and hence the entire list L does not change in content. Thus, if components are added to the components of $L^1$, $L^2$, $L^3$ and $L^4$ so as not change the content of $L^1$, $L^2$, $L^3$ and $L^4$, components x3, y2 and z2 are added to $L^1$, x1 is added to $L^2$, x3 and y1 are added to $L^3$, and x3 and z1 are added to $L^4$, whereby the processing result of the component adding unit 902 becomes L=[{x1, x3}×{y1, y2}×{z1, z2}] ∪ [{x1, x3}×{y1, y2}×{z1, z2}] ∪ [{x1, x3}×{y1, y2}×{z1, z2}] ∪ [{x1, x3}×{y1, y2}×{z1, z2}]. The processing result of the component adding unit 902 is transferred to the duplicate arrival condition list deleting unit 903. The duplicate arrival condition list deleting unit 903 deletes arrival condition list elements (arrival conditions), the deletion of which does not change the meaning. Specifically, if arbitrary two elements (arrival conditions) $L^i$ and $L^j$ (i<j) included in L satisfy that the component combination(s) indicated by $L^i$ ⊇ the component combination(s) indicated by $L^j$, $L^j$ is deleted from L. It is apparent that this processing will not change the component combinations expressed by the arrival condition list. In this example, the arrival condition list is finally set to L=[{x1, x3}×{y1, y2}×{z1, z2}], and is output from the arrival condition list output unit 904.

As described above, to realize the determination tree generating apparatus of the embodiment, it is necessary to utilize various set operations associated with arrival conditions (arrival lists). Various methods for set operations will now be described.

(1) A method for constructing an arrival condition list L (=$L_1$ ∪ $L_2$) expressing the sum of the component combinations expressed by an arrival condition list $L_1$ and those expressed by an arrival condition list $L_2$:

L is set to a list that includes both the elements (arrival conditions) of $L_1$ and the elements (arrival conditions) of $L_2$.

(2) A method for constructing an arrival condition L ($L^1$ ∩ $L^2$) expressing the component combination(s) shared between the component combination(s) expressed by an arrival condition $L^1$ and the component combination(s) expressed by an arrival condition $L^2$:

$L^1$ and $L^2$ are set to $L^1$=[$S^a × S^b × \ldots × S^z$] and $L^2$=[$T^a × T^b × \ldots × T^z$], respectively, where $S^i$ and $T^i$ represent component subsets belonging to a component category i. In this case, L=[($S^a ∩ T^a$)×($S^b ∩ T^b$)×...×($S^z ∩ T^z$)]. If the component category i satisfies $S^i ∩ T^i$=Ø, L=Ø.

(3) A method for constructing an arrival condition list L (=$L_1$ ∩ $L^2$) expressing the component combination(s) shared between the component combinations expressed by the arrival condition list $L_1$ and the component combination(s) expressed by the arrival condition $L^2$:

$L_1$ is set to $L_1$=$L_1^1$ ∪ ... ∪ $L_1^n$, where $L_1^i$ represents an element included in $L_1$. In this case, L is set to L=($L_1^1$ ∩ $L^2$) ∪ ... ∪ ($L_1^n$ ∩ $L^2$).

(4) A method for constructing an arrival condition list L (=$L_1$ ∩ $L_2$) expressing the component combination(s) shared between the component combinations expressed by the arrival condition list $L_1$ and the component combinations expressed by the arrival condition list $L_2$:

$L_2$ is set to $L_2$=$L_2^1$ ∪ ... ∪ $L_2^m$, where $L_2^i$ represents an element included in $L_2$. In this case, L is set to L=(($L_1$ ∩ $L_2^1$) ∩ ... ) ∩ $L_2^m$).

(5) A method for constructing an arrival condition list L (=$L^1$–$L^2$) expressing the component combination(s) obtained by removing the component combination(s) expressed by the arrival condition $L^2$ from the component combination(s) expressed by the arrival condition $L^1$:

$L^1$ and $L^2$ are set to $L^1$=[$S^a × S^b × \ldots × S^z$] and $L^2$=[$T^a × T^b × \ldots × T^z$], respectively, where $S^i$ and $T^i$ represent component subsets belonging to a component category i. In this case, if the component category i satisfies $S^i \cap T^i = \emptyset$, L is set to $L_1$ since there is no component combination shared between $L_1$ and $L_2$. In contrast, if the component category i does not satisfy that $S^i \cap T^i = \emptyset$, L is set to $L = [(S^a \yen T^a) \times S^b \times \ldots \times S^z)] \cup [S^a \times (S^b \yen T^b) \times \ldots \times S^z] \cup \ldots \cup [S^a \times S^b \times \ldots \times (S^z \yen T^z)]$, where $S^i \yen T^i$ represents the set obtained by removing the element(s) included in $T^i$ from $S^i$. The arrival condition that causes $S^i \yen T^i = \emptyset$ is removed from the elements of L.

(6) A method for constructing an arrival condition list L $(=L_1-L^2)$ expressing the component combination(s) obtained by removing the component combination(s) expressed by the arrival condition $L^2$ from the component combinations expressed by the arrival condition list $L_1$:

$L_1$ is set to $L_1 = L_1^1 \cup \ldots \cup L_1^n$, where $L_1^i$ represents an arrival condition as an element included in $L_1$. In this case, L is set to $L = (L_1^1 - L^2) \cup \ldots \cup (L_1^n - L^2)$.

(7) A method for constructing an arrival condition list L $(=L_1-L_2)$ expressing the component combination(s) obtained by removing the component combinations expressed by the arrival condition list $L_2$ from the component combinations expressed by the arrival condition list $L_1$:

$L_2$ is set to $L_2 = L_2^1 \cup \ldots \cup L_2^m$, where $L_2^i$ represents an arrival condition as an element included in $L_2$. In this case, L is set to $L = ((L_1 - L_2^1) - \ldots) - L_2^m$.

(8) A method for determining whether the component combination(s) expressed by the arrival condition $L^1$ includes the component combination(s) expressed by the arrival condition $L^2$ ($L^1 \supseteq L^2$):

$L^1$ and $L^2$ are set to $L^1 = [S^a \times S^b \times \ldots \times S^z]$ and $L^2 = [T^a \times T^b \times \ldots \times T^z]$, respectively, where $S^i$ and $T^i$ represent component subsets belonging to a component category i. In this case, if $S^i \supseteq T^i$ is satisfied for all component categories i, $L^1 \supseteq L^2$ is satisfied.

According to the above-described embodiment, a determination tree with a small number of points and nodes can be produced, and hence a product number corresponding to a particular component combination can be searched for efficiently, for example. However, depending upon the condition, classification based on component categories designated by a user may result in a determination tree that is enhanced in viewability for the user. For instance, assume that in an apparatus shipped utilizing the component combination table shown in FIG. 2 or 3, a defect has been found in a component y2 after shipping, and it is necessary to detect the product numbers associated with this defect. In this case, if a user designates, at the root, classification associated with the component category Y to produce such a determination tree as shown in the right portion of FIG. 4, it can be instantly detected that the product numbers associated with the component y2 are S001 and S002. Thus, designation of a component category by a user can be realized by beforehand inputting user designated information to the provisional determination unit 104 or the determination unit 109 (namely, the process of determining a component category associated with classification is ignored, and the component category designated by the user is utilized). Regarding the component categories for classification at the points or nodes that are not designated by the user, the determination tree generating apparatus of the embodiment can generate a determination tree with a small number of nodes and points, in which the designation by the user is satisfied. As a result, a determination tree, the whole of which can be easily grasped by the user and which is enhanced in viewability for the user, can be generated.

The determination tree of the embodiment is characterized partly in a mechanism for determining a component category, based on which classification is performed, with reference to the number of elements in an arrival condition list included in product-number/arrival-condition-list correspondence information. Since it is known that the arrival condition list attached to each leaf of the determination tree always has one element, it is understood that unless the number of elements of the arrival condition list included in the product-number/arrival-condition-list correspondence information obtained by the correspondence information extracting unit 107 becomes 1, no leaf can be generated (assuming that contraction of the arrival condition list is completely performed). It is evident from this that if the sum of the elements of the arrival condition lists included in the product-number/arrival-condition-list correspondence information is reduced in as an early stage as possible (i.e., at a node closer to the root), a leaf can be reached earlier. Namely, a determination tree with a smaller number of leaves can be generated. The reason why in the case of arrival condition lists expressing the same content, a smaller number of elements (arrival conditions), realized by an arrival condition list contracting function, enables a determination tree with a smaller number of nodes to be formed more easily will be described. Assumes here that when a certain classification component category is selected, in a contracted state, it can be easily understood that the number of elements of the corresponding arrival condition list in product-number/arrival-condition-list correspondence information becomes 1, and hence a leaf can be instantly generated. In this case, however, if no contraction is performed, it cannot be determined that a leaf can be instantly generated if the certain classification component category is selected, and therefore this classification component category may not be selected.

On the other hand, the existing ID3 algorithm utilizes an expectation value for an information amount. Both the method of the embodiment and the ID3 algorithm can be used to reduce the number of nodes of the determination tree. However, in both methods, it is not always guaranteed that if component classification is performed with respect to a selected component category, the number of nodes of the determination tree is minimized. Further, in the embodiment, it is not guaranteed that a determination tree with a smaller number of nodes than in the case of using the ID3 algorithm can always be generated. However, in an experiment, the apparatus of the embodiment generated a determination tree with 341 nodes (points) from a certain component combination table, whereas in the case of using the ID3 algorithm, a determination tree with 481 nodes (points) was produced from the same component combination table. From this, it is apparent that the determination tree generating apparatus of the embodiment provides an advantage equivalent to or more excellent than the case of using the ID3 algorithm.

Since the method of the embodiment differs from the ID3 algorithm in the approach to the selection of a component category, it is effective to differently use them according to the situations. For instance, in the determination tree generating apparatus of the embodiment, when it is determined whether classification should be performed with respect to the component category X or Y, if the sum of the numbers of elements of a target arrival condition list is equal to that of the numbers of the elements of another target arrival condition list, a component category is selected basically arbitrarily. In this case, however, if the determining unit 109 selects a component category using the ID3 algorithm, it can select a better component category, with the result that the possibility of finally generating a determination tree with a small number of nodes (points) is enhanced compared to the arbitrary selection of a component category.

In the above-described embodiment, a component combination table is displayed in the form of a determination tree with a small number of nodes (points), which enhances the readability of data. For instance, when a product number corresponding to particular component combinations is searched for, it can be detected by tracing the branches led from the root and corresponding to the components. This is much easier and faster than the detection of the product number in a component combination table, because in the latter, it requires a lot of time and labor to detect the portion in the table where the product number exists. Further, as mentioned above, the apparatus of the embodiment could generate a determination tree with 341 nodes (points) that is much less than 481 nodes (points) of the determination tree generated from the same component combination table, using the ID3 algorithm. Thus, in general, the number of branches to be traced to reach a product number is less in the apparatus of the embodiment than in the case of using the ID3 algorithm.

Further, since the embodiment can form a determination tree with a small number of nodes (points) that can be easily examined, it can be efficiently examined using this determination tree whether, for example, a component combination table expressed by the determination tree is a correct table. In addition, to search for a product number associated with a particular defective component, if the component category corresponding to the defective component is assigned to the root of the determination tree, all product numbers associated with the particular component defect are displayed as the leaves of the partial trees that use, as their roots, the child nodes reached from the root of the determination tree through the defective component. Thus, the product numbers associated with the particular component defect can be detected at high speed.

The apparatus of the embodiment can be used to present, in the form of a determination tree, a component combination table as a correspondence table between component combinations and product numbers.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A determination tree generating apparatus comprising:
    an input unit configured to receive a correspondence table showing correspondence between product numbers and component combinations belonging to component categories;
    a correspondence information generating unit configured to generate first correspondence information corresponding to the correspondence table and including an arrival condition list and the product numbers, the arrival condition list being a sum of sets of arrival conditions as elements each expressing one or more component combinations;
    a first condition generating unit configured to generate a first arrival condition for a first point of a determination tree, based on one of the correspondence table and the first correspondence information;
    a provisional determination unit configured to provisionally and sequentially determine all component categories to be classification component categories for the first point, each of the all component categories being used for classification at none of second points that serve as ancestor points of the first point;
    an assignment/calculation unit configured to assign one of the classification component categories to the first point, and to perform calculation for assigning component names to branches leading from the first point to one or more child points in accordance with the first arrival condition;
    a second condition generating unit configured to generate a second arrival condition for each of the child points in accordance with the first arrival condition and the calculation;
    an extracting unit configured to extract, from the first correspondence information, second correspondence information associated with the second arrival condition;
    an element number calculating unit configured to calculate, for each of the all component categories, number of elements included in an arrival condition list that is included in the second correspondence information;
    a determining unit configured to determine that one of the all component categories, which corresponds to a minimal number of elements, is a classification component category for the first point, the classification component category being included in the classification component categories;
    a point branch generating unit configured to generate a first point assigned to the classification component category, and to generate component names to be assigned to one or more branches leading from the assigned first point to one or more child points, based on a calculation result of the assignment/calculation unit; and
    a display and an output unit that displays a completed determination tree.

2. The apparatus according to claim 1, wherein at least one of the correspondence information generating unit, the assignment/calculation unit and the extracting unit includes:
    an adding unit configured to add, to the elements of the arrival condition list, a component name corresponding to any one of the component categories defined in the arrival condition list, such that no new component combination is included in the component combinations expressed by the arrival condition list; and
    a deleting unit configured to delete, from the arrival condition list, a first element included in the elements of the arrival condition list, if a set of component combinations expressed by the first element are included in a set of component combinations expressed by a second element included in the elements.

3. The apparatus according to claim 1, further comprising an acquiring unit configured to acquire the classification component categories,
    wherein
    when the acquiring unit acquires the classification component categories, the provisional determination unit provisionally determines that the acquired classification component categories are the classification component categories for the first point, and the determining unit determines that the acquired classification component categories are the classification component categories for the first point; and
    when the acquiring unit acquires no classification component categories, the provisional determination unit provisionally and sequentially determines that the all component categories are the classification component categories for the first point, and the determining unit determines that one of the all component categories is the classification component category for the first point.

4. The apparatus according to claim 1, wherein when a plurality of component categories correspond to a minimal number of elements, the determining unit determines the classification component category for the first point, using an ID3 algorithm.

5. A determination tree generating apparatus comprising:
a correspondence information input unit configured to directly receive first correspondence information is employed, the first correspondence information corresponding to a correspondence table and including an arrival condition list and product numbers, the correspondence table showing correspondence between the product numbers and component combinations belonging to component categories, the arrival condition list being a sum of sets of arrival conditions as elements each expressing one or more component combinations;
a first condition generating unit configured to generate a first arrival condition for a first point of a determination tree, based on one of the correspondence table and the first correspondence information;
a provisional determination unit configured to provisionally and sequentially determine all component categories to be classification component categories for the first point, each of the all component categories being used for classification at none of second points that serve as ancestor points of the first point;
an assignment/calculation unit configured to assign one of the classification component categories to the first point, and to perform calculation for assigning component names to branches leading from the first point to one or more child points in accordance with the first arrival condition;
a second condition generating unit configured to generate a second arrival condition for each of the child points in accordance with the first arrival condition and the calculation;
an extracting unit configured to extract, from the first correspondence information, second correspondence information associated with the second arrival condition;
an element number calculating unit configured to calculate, for each of the all component categories, number of elements included in an arrival condition list that is included in the second correspondence information;
a determining unit configured to determine that one of the all component categories, which corresponds to a minimal number of elements, is a classification component category for the first point, the classification component category being included in the classification component categories;
a point branch generating unit configured to generate a first point assigned to the classification component category, and to generate component names to be assigned to one or more branches leading from the assigned first point to one or more child points, based on a calculation result of the assignment/calculation unit; and
a display and an output unit that displays a completed determination tree.

* * * * *